Figure 1:
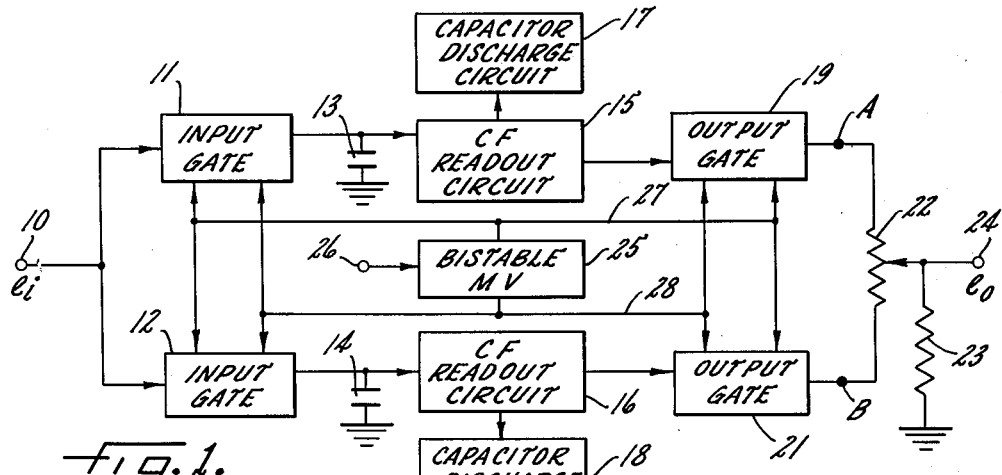

Dec. 28, 1965 T. E. HIGBIE 3,226,650
VIDEO PULSE AMPLITUDE DETECTOR FOR AIRBORNE RADAR SYSTEMS
Filed March 9, 1964

INVENTOR.
THOMAS E. HIGBIE
BY
*H. H. Losche*
ATT'YS.

United States Patent Office

3,226,650
Patented Dec. 28, 1965

3,226,650
VIDEO PULSE AMPLITUDE DETECTOR FOR AIRBORNE RADAR SYSTEMS
Thomas E. Higbie, Indianapolis, Ind., assignor to the United States of America as represented by the Secretary of the Navy
Filed Mar. 9, 1964, Ser. No. 350,950
11 Claims. (Cl. 329—109)
(Granted under Title 35, U.S. Code (1952), sec. 266)

The invention described herein may be manufactured and used by or for the Government of the United States of America for governmental purposes without the payment of any royalties thereon or therefor.

The present invention is generally related to airborne radar systems and the like and more particularly to detector circuitry for use in an airborne radar system which is not equipped with range gating facilities.

For navigational purposes it is desirable, and often in bad weather a matter of life or death, that the personnel of an aircraft be constantly aware of the drift angle of their craft, i.e., the angle between the aircraft heading and ground track as a result of the effect of an element such as wind on its flight path, in order that proper correction of the heading may be made to enable the craft to fly a direct course to its destination.

At the present time drift angle information may be obtained from any of several existing airborne Doppler navigation systems of either the pulsed or continuous wave (CW) variety. In addition to drift angle, these systems also compute the ground speed and total distance traveled, thereby providing the aircraft personnel with a solution for the complete navigational problem. However, in order to provide this additional information, these systems must be quite complex. They demand as much space on the aircraft as the normal target radar system, since they require separate power supplies, radio frequency (RF) systems, antenna assemblies, etc. The accumulated weight of such a system is considerable and often prohibitive, even after miniaturization with present techniques.

The present invention in conjunction with a small computer, which utilizes the output signal of the present invention and is not considered to be a part thereof, form an attachment which can be added to the existing radar system of an aircraft, even though that system may not have range gating capabilities, for obtaining the more important drift angle information without the need for attempting the installation of the usual Doppler navigation system. Thus the invention and its associated computer overcome the objections to the considerable space and weight requirements of the usual Doppler navigation systems of the prior art for obtaining drift angle information.

An object of the present invention is the provision of detector circuitry for use with an airborne radar system.

Another object is to provide a means for detecting and storing the pulse-to-pulse amplitude modulation present in the video return signal of most airborne radar systems.

A further object of the invention is the provision of detector circuitry for use with an airborne radar system lacking range gating capabilities, for enabling the determination of the drift angle of the aircraft.

Still another object is to provide circuitry for detecting and storing the pulse-to-pulse amplitude modulation present in the video return signal of most airborne radar systems, which circuitry is small in size, light in weight, and suitable for use with airborne radar systems lacking range gating capabilities, to enable computation of the drift angle of the aircraft.

Figure 2:
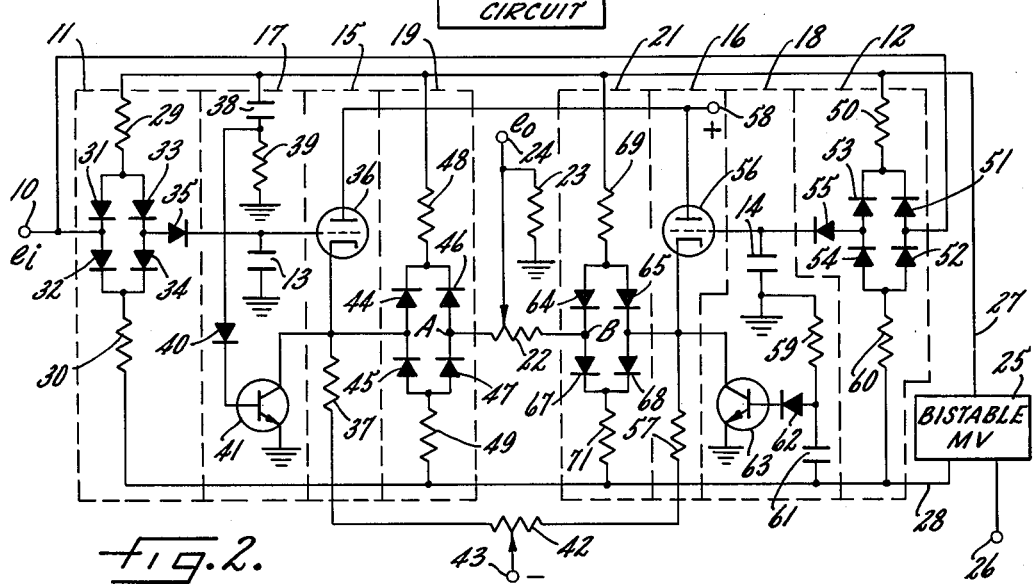

Other objects and features of the invention will become apparent to those skilled in the art as the disclosure is revealed in the following detailed description of a preferred embodiment of the invention as illustrated in the accompanying figures of drawing in which:

FIGURE 1 discloses a combination block-schematic diagram of a suitable embodiment of the invention;
FIGURE 2 shows a schematic diagram of one embodiment of the invention, and
FIGURE 3 depicts representative waveforms which might exist at various points throughout the embodiments of the invention shown in FIGURES 1 and 2 at representative times $t_0$ through $t_6$.

Referring now to the drawing, wherein like reference characters designate like or corresponding parts throughout the various views, there is shown in FIGURE 1 an input terminal 10 for coupling to the video amplifier stage of a radar receiver in an existing airborne radar system. Input terminal 10 is coupled to input gates 11 and 12 which have their output terminals coupled to storage capacitors 13 and 14, respectively, capacitors 13 and 14 each having their other terminal coupled to ground potential. Capacitor 13 is further coupled to cathode follower readout circuit 15, while capacitor 14 is coupled to cathode follower readout circuit 16. Readout circuits 15 and 16 are coupled to capacitor discharge circuits 17 and 18, respectively, and via output gates 19 and 21, respectively, to opposite ends of a balancing potentiometer 22, which has its movable contact coupled to an output terminal 24 and via resistance 23 to ground potential. The signal information ($e_0$) developed by the invention is provided at output terminal 24 for utilization in subsequent circuitry. A bistable multivibrator 25 has an input terminal 26 for receiving synchronizing (sync) pulses from an associated radar transmitter in order to switch multivibrator 25 each time a new pulse is radiated from the radar transmitter. One stage of the multivibrator is coupled via conductor 27 to input gates 11 and 12 and output gates 19 and 21, while the other stage thereof is coupled via conductor 28 to these same gates; when a positive potential is presented to conductor 27 by multivibrator 25, a negative potential will be presented to conductor 28, and vice versa.

FIGURE 2 discloses a schematic representation of one suitable embodiment of the invention in which input terminal 10 is coupled to the common junction of gating diodes 31 and 32 of input gate 11, and also coupled to the common junction of gating diodes 51 and 52 of input gate 12. Input gate 11 includes diodes 31 and 33 having their respective anode electrodes coupled in common via a resistor 29 to a conductor 27 which is coupled to one stage of bistable multivibrator 25, and diodes 32 and 34 having their anode electrodes coupled to the cathode electrodes of diodes 31 and 33, respectively, and having their cathode electrodes coupled in common via a resistor 30 to a conductor 28 which, in turn, is coupled to the other stage of multivibrator 25. A diode 35 has its anode electrode coupled to the common junction of diodes 33 and 34 and its cathode electrode coupled to a first plate of a storage capacitor 13; capacitor 13 has its other plate coupled to ground potential. The first plate of capacitor 13 is further coupled to the grid electrode of a triode vacuum tube 36 which has its cathode electrode coupled via a resistor 37 and a balancing potentiometer 42 to a source of negative direct current potential 43. A capacitor 38 has one plate thereof coupled to conductor 27 and the other plate coupled via a resistor 39 to ground potential and via a diode rectifier 40 to the base electrode of a transistor 41 which has its collector electrode coupled to the cathode electrode of triode 36 and its emitter electrode coupled to ground potential. The cathode electrode of triode 36 is further coupled to the common junction of output gating diodes 44 and 45 which form a portion of output gate 19; a diode 46 has its cathode electrode coupled in common with the cathode electrode of diode 44 and via a resistance 48 to conductor 27, and has its anode electrode coupled to the cathode electrode of a diode 47 which has its anode electrode coupled in common with the anode electrode of diode 45 and via a resistor 49 to conductor 28. The common junction of diodes 46 and 47, shown as reference point A in block 19 is coupled to one terminal of the fixed resistance of balancing potentiometer 22 whose movable contact arm is coupled, via resistor 23 to ground potential and, directly to output terminal 24 for coupling to following circuitry. Input gate 12 is coupled via a conductor directly to input terminal 10. This conductor is coupled to the common junction of gating diodes 51 and 52, diode 51 having its cathode electrode coupled in common with the cathode electrode of a diode 53 and via a resistor 50 to conductor 27; the anode electrode of diode 53 is coupled to the cathode electrode of a diode 54 which has its anode electrode coupled in common with the anode electrode of diode 52 and via a resistor 60 to conductor 28. A rectifying diode 55 has its anode electrode coupled to the common junction of diodes 53 and 54, and its cathode electrode coupled to a first plate of a storage capacitor 14 which has its other plate coupled to ground potential and its first plate further coupled to the grid electrode of a triode vacuum tube 56. Tube 56 has its cathode electrode coupled via a resistor 57 and a balancing potentiometer 42 to a source of negative direct current potential 43, and its anode electrode is coupled in common with the anode electrode of tube 36 to a source of positive direct current potential 58. A capacitor 61 has one plate thereof coupled to conductor 28 and the other plate coupled via a resistor 59 to ground potential and via a diode rectifier 62 to the base electrode of a transistor 63 which has its collector electrode coupled to the cathode electrode of triode 56 and its emitter electrode coupled to ground potential. The cathode electrode of triode 56 is further coupled to the common junction of output gating diodes 65 and 68 which form a portion of output gate 21; a diode 64 has its anode electrode coupled in common with the anode electrode of diode 65 and via a resistor 69 to conductor 27, and has its cathode electrode coupled to the anode electrode of a diode 67 which has its cathode electrode coupled in common with the cathode electrode of diode 68 and via a resistor 71 to conductor 28. The common junction of diodes 64 and 67, shown as reference point B in block 21, is coupled to the remaining terminal of the fixed resistance of balancing potentiometer 22 and via its movable contact arm to output terminal 24.

Figure 3:
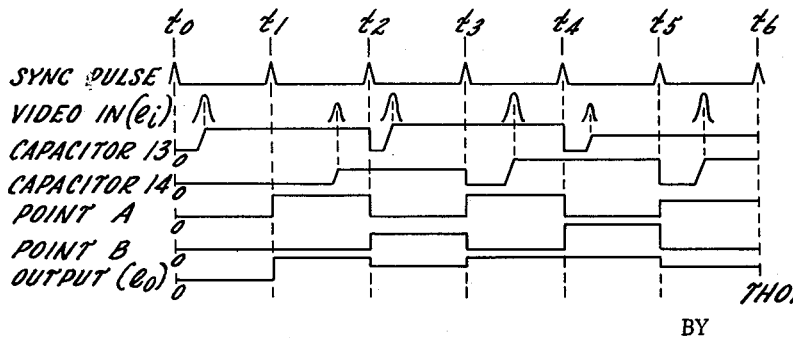

FIGURE 3 depicts various waveforms as they might appear at different points throughout the circuit of an embodiment of the invention as shown in FIGURES 1 and 2 for equal periods of time from $t_0$ to $t_6$. The first row of waveforms represent synchronizing pulses of the type supplied by an associated radar transmitter system and applied to terminal 26 of multivibrator 25, with one of the sync pulses being supplied each time a pulse of energy is transmitted from the radar system, i.e., at times $t_0$, $t_1$, $t_2$, etc., at the pulse repetition frequency (PRF) of the radar transmitter. The second row of waveforms depicts the video signal applied to input terminal 10 of the invention and represents the amplitude modulation present on the returned signal, received and amplified in the receiver circuitry of the associated radar system. This amplitude modulation on the returned radar signal, which is utilized as the input signal for the present invention, contains information, as a result of the Doppler effect from which the drift angle of the aircraft may be computed. This amplitude modulation of the returned signal is produced by the beating of numerous Doppler-frequency signals reflected from individual "scatterers" (any point on the ground capable of reflecting radar energy) on the ground in the area illuminated by the antenna pattern as the antenna scans at some azimuth angle during the flight of the aircraft. The third row of waveforms represents the voltage level as measured across the plates of storage capacitor 13 at the various times from $t_0$ through $t_6$, and the fourth row indicates the relative voltage level as measured across the plates of storage capacitor 14 at corresponding times. The fifth and sixth rows represent the waveforms present at points A and B in FIGURES 1 and 2 during the various indicated periods. The seventh row depicts the desired output signal present at output terminal 24 for times $t_0$ through $t_6$.

The embodiment of the invention shown in FIGURE 2 has been constructed and satisfactorily tested utilizing the following values and components:

| | |
|---|---|
| Tubes 36 and 56 | 5703 |
| Transistors 41 and 63 | 2N338 |
| Diodes 35 and 55 | FD300 |
| All other diodes | FD200 |
| Resistors 29, 30, 50, and 60 _____ohms__ | 20,000 |
| Resistors 48, 49, 69, and 71 _____do____ | 27,000 |
| Resistors 37 and 57 _____do____ | 390,000 |
| Resistors 39 and 59 _____do____ | 10,000 |
| Resistor 23 _____do____ | 51,000 |
| Potentiometer 22 _____do____ | 50,000 |
| Potentiometer 42 _____do____ | 250,000 |
| Capacitors 13 and 14 _____mmfd__ | 35 |
| Capacitors 38 and 63 _____mmfd__ | 50 |
| Potential source 43 _____v. D.C__ | −400 |
| Potential source 58 _____v. D.C__ | +100 |

It is to be understood that these particular components and values are presented only for illustrative purposes and are not intended to limit the scope of the invention in any way.

*Operation*

The operation of the invention occurs in the following manner. Assuming for purposes of illustration that at time $t_0$ input terminal 10 is coupled to the receiver video amplifier section of the associated radar system, that multivibrator input terminal 26 is coupled to the radar transmitter system for receiving sync pulses at times $t_0$, $t_1$, $t_2$, et cetera, that sources of potential 43 and 58 are operative, and that storage capacitors 13 and 14 are initially completely discharged, the invention is ready to receive input signals at terminal 10 which will be of the type shown in the second row of FIGURE 3, i.e., of varying amplitude and occurring at different times within an individual period. At time $t_0$ a pulse of energy is transmitted by the associated radar system and a sync pulse is applied to terminal 26 of multivibrator 25 causing it to switch from one stage to the other, and for purposes of explanation it will be assumed that at time $t_0$, after multivibrator 25 has switched, a positive potential is presented to conductor 27, and a negative potential to conductor 28, thereby. These potentials on conductors 27 and 28 are to be understood to be greater in magnitude than the maximum amplitude of any anticipated input signal applied to terminal 10. With a positive potential present on conductor 27 and a negative potential present on conductor 28 during the period from $t_0$ to $t_1$, input gate 11 will be forward biased and input gate 12 will be reverse biased; also output gate 19 will be reverse biased and output gate 21 will be forward biased during this period. Thus the video input signal ($e_1$), when applied to terminal 10, will be blocked at reverse biased input gate 12 but will be conducted through input gate 11 via forward biased diode pairs 31–33 and 32–34 to diode 35, which is also forward biased, and therethrough to storage capacitor 13 which rapidly charges to the peak amplitude of the input signal as depicted by the waveform in the third row of FIGURE 3 as it is shown to rise from the zero level to a level representing the peak amplitude of the video input signal immediately above in the second row; as shown by the fourth, fifth, sixth and seventh rows of FIGURE 3 the voltage across discharged storage capacitor 14, at points A and B, and at output terminal 24 will all remain at zero during the period $t_0$ to $t_1$. At time $t_1$ the associated radar system will transmit a second pulse of energy and simultaneously therewith a sync pulse will be supplied to terminal 26 of the invention causing multivibrator 25 to switch from one state to the other, thereby placing a negative potential on conductor 27 and a positive potential on conductor 28; these potentials cause previously forward biased gates 11 and 21 to become reverse biased or "closed," and gates 12 and 19 to become forward biased or "open." As multivibrator 25 switches at time $t_1$, the change from positive to negative potential on conductor 27 causes the differentiating network comprised of capacitor 38 and resistor 39 to produce a negative pulse which would be applied to the base of transistor 41 except for diode 40 which blocks it; simultaneously therewith, the differentiating network composed of capacitor 61 and resistor 59 produces a positive pulse due to the negative-to-positive change in potential on conductor 28, and this positive pulse is passed by forward biased diode 62 to the base electrode of transistor 63 causing it to momentarily conduct for the duration of the positive pulse and place the cathode electrode of triode 56 at ground potential, and if a charge has previously been placed on storage capacitor 14, a current will flow between the grid and cathode electrodes of triode 56 to ground, thereby discharging capacitor 14 and placing it in condition to receive a new charge (however, in this explanation both capacitors 13 and 14 were considered to be completely discharged at time $t_0$ and so no charge would be present on capacitor 14 to be removed at time $t_1$). As output gate 19 becomes forward biased at time $t_1$, a potential proportional to the charge stored during the period $t_0$ to $t_1$ and presently remaining on capacitor 13 will be presented, by cathode follower action of triode 36, at point A in output gate 19 and via balancing potentiometer 22 at output terminal 24 for utilization in following information processing equipment, such as a drift angle computer. As shown in the last row of FIGURE 3, this potential is present at output terminal 24 during the entire period from $t_1$ to $t_2$. During this same period, $t_1$ to $t_2$, the return from the radar energy transmitted at time $t_1$ by the associated radar system will be received in its receiver system and the Doppler modulation thereon will be provided to input terminal 10 and thereby coupled to input gates 11 and 12. As previously indicated, the positive potential present on conductor 28, and the negative potential on conductor 27, will cause input gate 11 to be closed and input gate 12 to be forward biased or open, so that in addition to presenting an output potential at terminal 24 proportional to any charge stored on capacitor 13, the input signal presented to terminal 10 during this period ($t_1$ to $t_2$) will be passed by gate 12 and stored on capacitor 14 in the same manner as previously indicated for storage of the previous pulse on capacitor 13.

At time $t_2$ a third sync pulse will be presented to terminal 26 causing multivibrator 25 to again change states, placing a positive potential on conductor 27 and a negative potential on conductor 28, thereby closing input gate 12 and output gate 19 and opening output gate 21 and input gate 11. At time $t_2$ the change in potential from negative to positive on conductor 27 is differentiated by capacitor 38 and resistor 39 to provide a positive pulse which would be passed by forward-biased diode 40 to the base electrode of transistor 41, causing it to conduct for the duration of the pulse thereby placing the cathode electrode of triode 36 at ground potential, causing a current to flow between the grid and cathode electrodes thereof, discharging capacitor 13 to place it in condition to receive a new charge during the period from $t_2$ to $t_3$. During the same period the potential stored on capacitor 14 is presented by cathode follower action of triode 56 and open gate 21 to output terminal 24. As can be seen from FIGURE 3 the output potential $e_0$ present at terminal 24 is always proportional to the charge stored on the respective capacitor during the previous period. This procedure of storage, readout, discharge, and restorage continues alternately in the respective channels during the operation of the invention.

Balancing potentiometers 22 and 42 permit minor inequalities in the electrical characteristics of the components of the two storage and readout networks to be balanced after construction of the invention, so that an output signal of constant amplitude would be present at output terminal 24 upon application of input pulses of equal amplitude to terminal 10. This enables the invention to be satisfactorily produced without the use of balanced precision components and their inherent increased cost.

Thus it becomes apparent from the foregoing description and annexed drawing that the invention, a detector circuit for airborne radar systems not having range gating facilities, is a useful and practical device having many applications in the field of electronics, especially in the area of airborne radar systems. The usefulness of the device is enhanced by its reliability and provision for balancing opposing channels to enable the use of relatively inexpensive components in its construction.

Obviously many modifications and variations of the present invention are possible in the light of the above teachings. It is therefore to be understood that, within the scope of the appended claims, the invention may be practiced otherwise than as specifically described.

I claim:
1. A detector circuit comprising:
   first and second input control means;
   input terminal means coupled in common to said first and second input control means for providing electrical input signals simultaneously thereto;
   first and second storage means, said first storage means coupled to said first input control means and said second storage means coupled to said second input control means, said first and second input control means alternately providing said electrical input signals to said first and second storage means for temporary retention therein;
   first and second signal readout means, said first signal readout means being coupled to said first storage means and said second signal readout means being coupled to said second storage means;
   first and second output control means, said first output control means being coupled to said first signal readout means and said second output control means being coupled to said second signal readout means;
   first and second signal removal means for alternately removing said electrical input signals from said first and second storage means after said storage means have been read out in preparation for storage of subsequent ones of said electrical input signals, said first signal removal means being coupled to said first storage means via said first signal readout means and said second signal removal means being coupled to said second storage means via said second signal readout means;
   output terminal means coupled in common to said first and second output control means for providing thereat signal information alternately obtained from said first and second storage means by said first and second signal readout means and said first and second output control means; and
   bilevel electrical potential generating means having input means for receiving external synchronizing control signals to cause said bilevel generating means to switch from one level to the other, said bilevel generating means being coupled to said first and second input control means and to said first and second output control means.

2. A detector circuit as set forth in claim 1 wherein said first and second input control means and said first and second output control means comprise solid state gating circuitry.

3. A detector circuit as set forth in claim 1 wherein said first and second storage means comprise equal valued electrical capacitance means.

4. A detector circuit as set forth in claim 1 wherein said first and second signal readout means comprise electron tube cathode following circuitry.

5. A detector circuit as set forth in claim 1 wherein said first and second signal removal means comprise solid state switchable control circuitry for momentarily grounding and discharging said first and second storage means.

6. A detector circuit as set forth in claim 1 wherein said bilevel electrical potential generating means comprises a bistable multivibrator circuit having a first output conductor at a first level of potential and a second output conductor at a second level of potential simultaneously, said first and second levels reversing upon said multivibrator switching from one stage to the other.

7. A detector circuit as set forth in claim 2 wherein said first and second storage means comprise equal valued electrical capacitance means.

8. A detector circuit as set forth in claim 7 wherein said first and second signal readout means comprise electron tube cathode following circuitry.

9. A detector circuit as set forth in claim 8 wherein said first and second signal removal means comprise solid state switchable control circuitry for momentarily grounding and discharging said first and second storage means.

10. A detector circuit as set forth in claim 9 wherein said bilevel electrical potential generating means comprises a bistable multivibrator circuit having a first output conductor at a first level of potential and a second output conductor at a second level of potential simultaneously, said first and second levels reversing upon said multivibrator switching from one stage to the other.

11. A video amplitude detector circuit for use with an airborne radar system comprising:
first and second solid state input gating control means;
input terminal means coupled in common to said first and second input gating control means for providing electrical input signals simultaneously thereto;
first and second capacitive storage means, said first capacitive storage means coupled to said first input gating control means and said second capacitive storage means coupled to said second input gating control means, said first and second input gating control means alternately providing said electrical input signals to said first and second capacitive storage means for temporary retention therein;
first and second cathode following signal readout means, said first signal readout means being coupled to said first capacitive storage means and said second cathode following signal readout means being coupled to said second capacitive storage means;
first and second solid state output gating control means, said first output gating control means being coupled to said first cathode following signal readout means and said second output gating control means being coupled to said second cathode following signal readout means;
first and second solid state switchable signal removal control means for alternately removing said electrical input signals from said first and second capacitive storage means after said electrical input signals have been utilized in preparation for storage of subsequent ones thereof, said first signal removal control means being coupled to said first capacitive storage means via said first cathode following signal readout means and said second signal removal control means being coupled to said second capacitive storage means via said second cathode following signal readout means;
output terminal means coupled in common to said first and second output gating control means for providing thereat signal information alternately obtained from said first and second capacitive storage means by said first and second cathode following signal readout means and said first and second output gating control means; and
bilevel bistable multivibrator means having input means for receiving external synchronizing control signals to cause said bilevel multivibrator means to switch from one stage to the other, said bilevel multivibrator means being coupled to said first and second input gating control means and said first and second output gating control means.

References Cited by the Examiner

UNITED STATES PATENTS 2,415,566  2/1947  Rhea _____ 343—16

ROY LAKE, *Primary Examiner.*

KATHELEEN H. CLAFFY, ALFRED L. BRODY, *Assistant Examiners.*